US011784787B2

(12) United States Patent
Léal (10) Patent No.: US 11,784,787 B2
(45) Date of Patent: Oct. 10, 2023

(54) STREAMING WITH LOW LATENCY ENCRYPTION READY PACKAGING

(71) Applicant: Synamedia Vividtec Holdings, Inc., Lawrenceville, GA (US)

(72) Inventor: Alain Léal, Chanteloup (FR)

(73) Assignee: Synamedia Limited, Staines Upon (GB)

(*) Notice: Subject to any disclaimer, the term of this patent is extended or adjusted under 35 U.S.C. 154(b) by 35 days.

(21) Appl. No.: 17/590,507

(22) Filed: Feb. 1, 2022

(65) Prior Publication Data

US 2023/0246808 A1 Aug. 3, 2023

(51) Int. Cl.
*H04L 9/06* (2006.01)
*H04L 9/40* (2022.01)
*H04N 21/2347* (2011.01)

(52) U.S. Cl.
CPC ........ *H04L 9/0618* (2013.01); *H04L 63/0457* (2013.01); *H04N 21/23476* (2013.01); *H04L 2209/20* (2013.01)

(58) Field of Classification Search
CPC ............... H04L 9/0618; H04L 63/0457; H04L 2209/20; H04N 21/23476
See application file for complete search history.

(56) References Cited

U.S. PATENT DOCUMENTS

2012/0060033 A1* 3/2012 Giuliani ............... H04L 9/0631 713/168

2018/0097632 A1* 4/2018 Greiner ............... G06F 12/1408
2018/0288500 A1 10/2018 Stockhammer
2020/0065500 A1* 2/2020 Munsil ................. H04L 9/0819

OTHER PUBLICATIONS

Extended European Search Report for corresponding EP Application No. 23151587.5 dated Jun. 7, 2023.
KATS (Republic of Korea), "Technologies under Consideration for ISOBMFile Format", ISO/IEC 20837, 4th Edition, Dec. 1, 2021, 54 pages.
ISO/IEC, "Information technology—MPEG systems technologies—Part 7: Common encryption in ISO base media file format files", ISO/IEC 23001, Dec. 1, 2021, 51 pages.

* cited by examiner

*Primary Examiner* — Vu V Tran
(74) *Attorney, Agent, or Firm* — Fernando & Partners LLP (57) ABSTRACT

Techniques for packaging media content in a low latency encryption ready format for streaming are described herein. In accordance with various embodiments, one or more packagers that include create an intermediate unit including at least one data portion from media content. The packager(s) further determine a size for reformatting the intermediate unit, where the size can include a padding amount for the at least one data portion. The packager(s) also package the intermediate unit to a reformatted partial segment according to the size without encrypting the at least one data portion, including injecting into the partial segment at least one encryption specific box and injecting padding into the at least one data portion according to the padding amount. The packager(s) then package the reformatted partial segment for streaming while maintaining the size, including generating a manifest for streaming the media content specifying the size of the reformatted partial segment.

20 Claims, 9 Drawing Sheets

```
#EXTM3U
#EXT-X-VERSION:6
#EXT-X-MAP:URI="TS-49410_1_video-init.mp4"
#EXT-X-TARGETDURATION:7
#EXT-X-PART-INF:PART-TARGET=1.050
...
#EXTINF:6.000
TS-49410_1_video-1475998049310239.mp4    /210-1
#EXT-X-PART:DURATION=1.000,URI="TS-49410_1_video-1475998054710239.mp4",BYTERANGE="200438@0",INDEPENDENT=YES
#EXT-X-PART:DURATION=1.000,URI="TS-49410_1_video-1475998054710239.mp4",BYTERANGE="153689@200438"
#EXT-X-PART:DURATION=1.000,URI="TS-49410_1_video-1475998054710239.mp4",BYTERANGE="257191@354127",INDEPENDENT=YES
#EXT-X-PART:DURATION=1.000,URI="TS-49410_1_video-1475998054710239.mp4",BYTERANGE="136861@611318"
#EXT-X-PART:DURATION=1.000,URI="TS-49410_1_video-1475998054710239.mp4",BYTERANGE="243943@748179",INDEPENDENT=YES
#EXT-X-PART:DURATION=1.000,URI="TS-49410_1_video-1475998054710239.mp4",BYTERANGE="182722@992122"
#EXTINF:6.000
TS-49410_1_video-1475998054710239.mp4    /210-2
#EXT-X-PART:DURATION=1.000,URI="TS-49410_1_video-1475998060110239.mp4",BYTERANGE="210088@0",INDEPENDENT=YES
#EXT-X-PART:DURATION=1.000,URI="TS-49410_1_video-1475998060110239.mp4",BYTERANGE="175689@210088"
#EXT-X-PART:DURATION=1.000,URI="TS-49410_1_video-1475998060110239.mp4",BYTERANGE="204237@385777",INDEPENDENT=YES
#EXT-X-PRELOAD-HINT:TYPE=PART,URI="TS-49410_1_video-1475998060110239.mp4",BYTERANGE-START=590014
```

T=X
EXT-X-PRELOAD-HINT:TYPE=PART,URI="TS-49410_1_video-1475998060611039.mp4",BYTERANGE-START=0

TS-49410_1_video-1475998060611039.mp4
(temporary size = 0 bytes)

T=X+1
EXT-X-PART:DURATION=1.000,URI="TS-49410_1_video-1475998060611039.mp4",BYTERANGE="210088@0",INDEPENDENT=YES
EXT-X-PRELOAD-HINT:TYPE=PART,URI="TS-49410_1_video-1475998060611039.mp4",BYTERANGE-START=210088

TS-49410_1_video-1475998060611039.mp4
(temporary size = 210088 bytes)
partial segment 1 of 210088 bytes T=X+2
EXT-X-PART:DURATION=1.000,URI="TS-49410_1_video-1475998060611039.mp4",BYTERANGE="210088@0",INDEPENDENT=YES
EXT-X-PART:DURATION=1.000,URI="TS-49410_1_video-1475998060611039.mp4",BYTERANGE="175689@210088"
EXT-X-PRELOAD-HINT:TYPE=PART,URI="TS-49410_1_video-1475998060611039.mp4",BYTERANGE-START=385777

TS-49410_1_video-1475998060611039.mp4
(temporary size = 210088 + 175689 bytes)
partial segment 1 of 210088 bytes | partial segment 2 of 175689 bytes T=X+3
EXT-X-PART:DURATION=1.000,URI="TS-49410_1_video-1475998060611039.mp4",BYTERANGE="210088@0",INDEPENDENT=YES
EXT-X-PART:DURATION=1.000,URI="TS-49410_1_video-1475998060611039.mp4",BYTERANGE="175689@210088"
EXT-X-PART:DURATION=1.000,URI="TS-49410_1_video-1475998060611039.mp4",BYTERANGE="204237@385777",INDEPENDENT=YES
EXT-X-PRELOAD-HINT:TYPE=PART,URI="TS-49410_1_video-1475998060611039.mp4",BYTERANGE-START=590014

TS-49410_1_video-1475998060611039.mp4
(temporary size = 210088 + 175689 + 204237 bytes)
partial segment 1 of 210088 bytes | partial segment 2 of 175689 bytes | partial segment 3 of 204237 bytes

STREAMING WITH LOW LATENCY ENCRYPTION READY PACKAGING

TECHNICAL FIELD

The present disclosure relates generally to multimedia content streaming and, more specifically, to packaging multimedia content for low latency streaming.

BACKGROUND

In Low Latency HTTP Live Streaming (LL-HLS) domain, packagers often use segment byte ranges to produce playlists and mutualize with Low Latency Dynamic Adaptive Streaming over HTTP (LL-DASH). The segment byte ranges describe locations in Fragmented MP4 (FMP4) segments of partial segments, where each of the partial segments includes, for instance, a Movie Fragment (MOOF) box and a Media Data (MDAT) box. Encryption changes the size of the partial segments, e.g., by adding new MPEG-4 boxes and/or introducing padding when performing Cipher Block Chaining (CBC) encryption. As such, from a clear (e.g., unencrypted) segment size, the just-in-time packager (JITP) cannot estimate the encrypted partial segments sizes to build up the output HLS playlist with the correct byte range. Moreover, when using the encrypted LL-HLS segment as an input, in order to signal the segment byte range, the JITP would have to decrypt the encrypted segment first to produce other formats (e.g., HLS-TS, HSS, etc.) and/or change encryption keys for segment size determination. Accordingly, the size fluctuation of segments and/or sub-segments during packaging in previously existing solutions implies an additional processing cost.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, an intermediate packager uses a low latency encryption ready format as an intermediate format to keep the size of the partial segments predictable before and after encryption. The format includes encryption specific boxes, e.g., sample auxiliary information size (SAIZ) box, sample auxiliary information offset (SAIO) box, sample encryption (SENC) box, etc., even when the video or audio data are not encrypted. In some embodiments, the intermediate packager includes additional Cipher Block Chaining (CBC) padding in the low latency encryption ready formatted segments as if the media data would have been encrypted. To encrypt the segments in the low latency encryption ready format, the just-in-time packager (JITP) applies the encryption on the data part signaled in the encryption specific boxes. Because the padding is already part of the data, the encryption would not cause any segment size expansion. As such, the segments and partial segments have the same size before and after the encryption. Consequently, the JITP can generate the playlist using byte ranges based on predictable input partial segments sizes. Using the low latency encryption ready format, when the segment is not consumed, the processing cost associated to the encryption is insignificant, and the segment is resilient to key changes, thus realizing savings in processing cost.

In accordance with various embodiments, a low latency encryption ready packaging method is performed at one or more packagers that include one or more processors and one or more non-transitory memory. The method includes creating an intermediate unit including at least one data portion from media content. The method further includes determining a size for reformatting the intermediate unit, where the size includes a padding amount for the at least one data portion. The method also includes packaging the intermediate unit to a reformatted partial segment according to the size without encrypting the at least one data portion, where such packaging includes injecting into the intermediate unit at least one encryption specific box and injecting padding into the at least one data portion according to the padding amount. The method additionally includes packaging the reformatted partial segment for streaming while maintaining the size, including generating a manifest for streaming the media content specifying the size of the reformatted partial segment.

EXAMPLE EMBODIMENTS

Methods, devices, and systems in accordance with various embodiments described herein include an intermediate packager and a just-in-time packager (JITP) that process segments with a low latency encryption ready format to keep the size of the Movie Fragment (MOOF) and Media Data (MDAT) boxes unchanged before and after data encryption. In some embodiments, the intermediate packager generates intermediate units in the low latency encryption ready format, which includes encryption specific boxes and possibly padding while the media data is in clear (e.g., unencrypted). In some embodiments, the JITP packages the intermediate units in the low latency encryption ready format into various formats for streaming without changing the size of the MOOF and MDAT boxes, regardless the media data is encrypted or in clear and uses the size of the intermediate partial segment for specifying segment byte ranges in the manifest for low latency streaming. As such, using the low latency encryption ready format, the JITP can obtain the size of the partial segment prior to packaging the intermediate segment and maintain the size during packaging to reduce the processing cost.

Figure 1A:
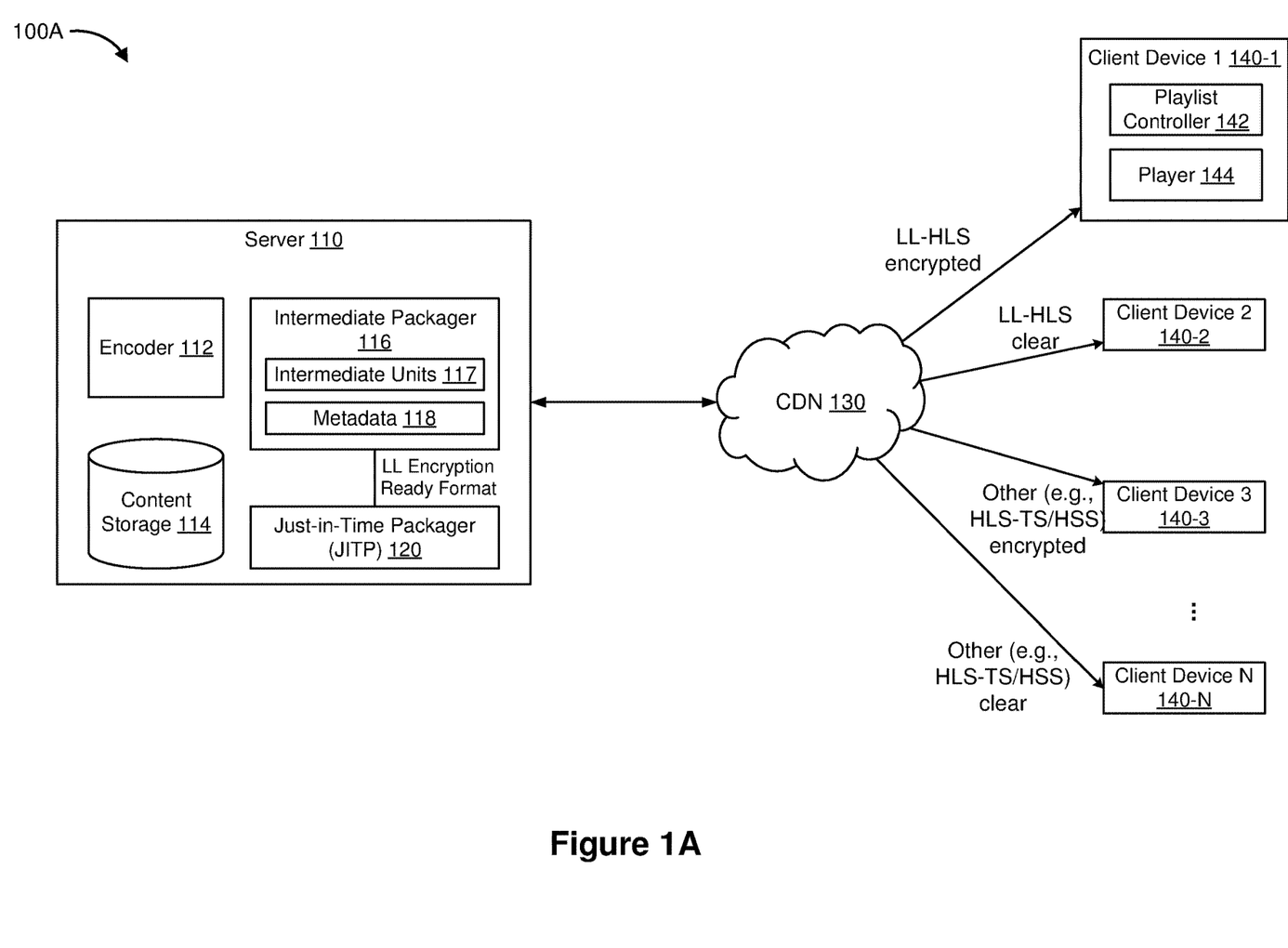
FIGS. 1A and 1B are block diagrams illustrating an exemplary multimedia content delivery system using a low latency encryption ready format for packaging, in accordance with some embodiments.
Figure 2A:
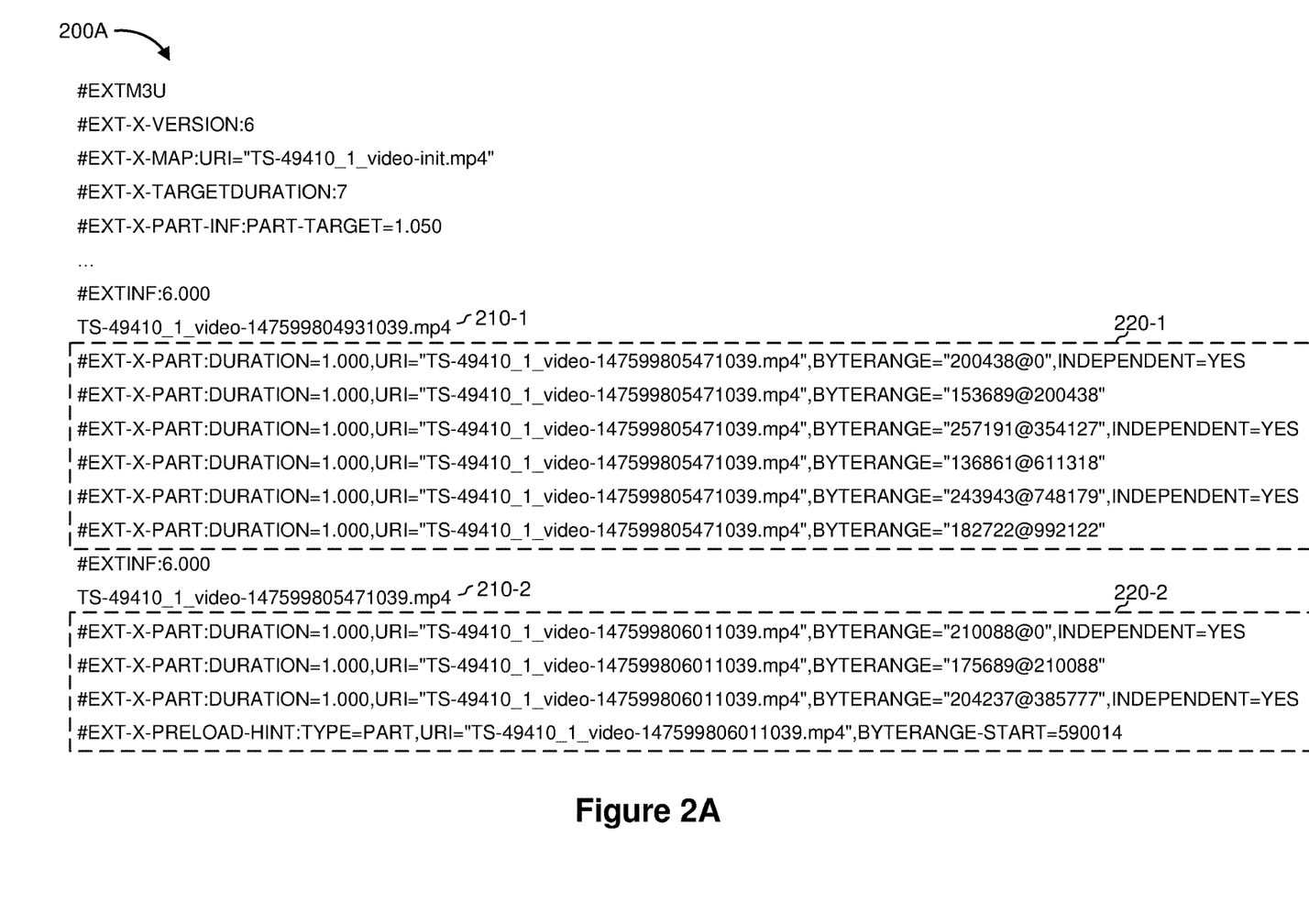
FIGS. 2A and 2B illustrate an exemplary Low Latency HTTP Live Streaming (LL-HLS) playlist specifying partial segments for low latency streaming and serving the partial segments according to the LL-HLS playlist, in accordance with some embodiments.
Figure 2B:
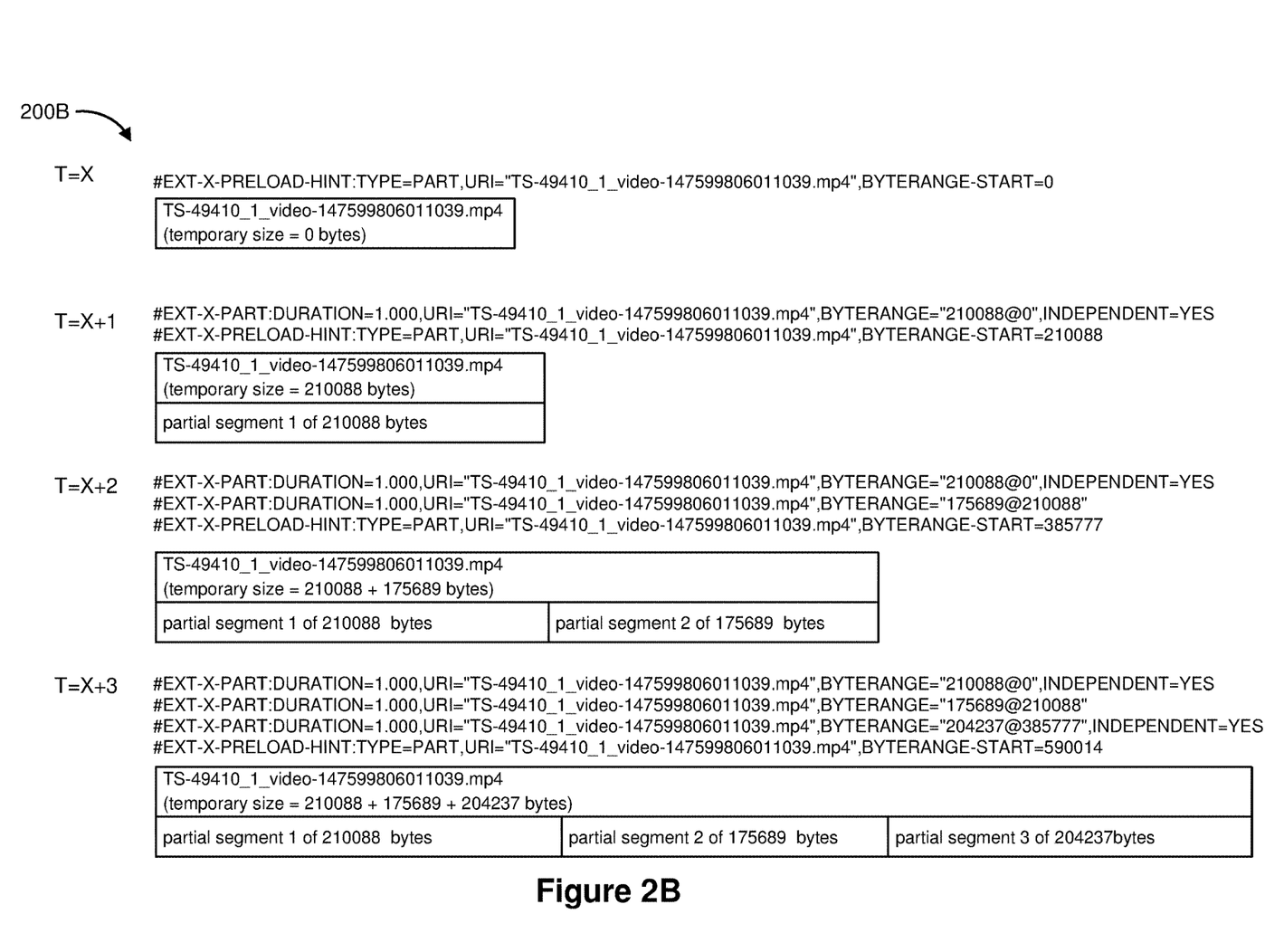

Reference is now made to FIG. 1A, which is a block diagram of an exemplary multimedia content delivery system 100A in accordance with some embodiments. In some embodiments, the multimedia content delivery system 100A includes a server 110 (e.g., a headend) for providing multimedia content, a content delivery network (CDN) 130 for facilitating the content delivery, and a plurality of client devices 140 on the receiving end, e.g., client device 1 140-1, client device 2 140-2, client device 3 140-3, . . . , client device N 140-N, etc. In some embodiments, the exemplary client device 1 140-1 includes a playlist controller 142 for requesting and obtaining playlist and/or manifest files and a player 144 for playing the content from the server 110 via the CDN 130 according to the playlist and/or the manifest. An exemplary playlist obtained by the playlist controller 142 is shown in FIG. 2A; and FIG. 2B shows serving the content according to the exemplary playlist upon requests by the player 144.

Although a single server 110 and a single CDN 130 are illustrated in FIG. 1A, the system 100A can include one or more servers 110 and can include zero, one, or more CDNs 130. For instance, the CDN(s) 130 may be included in the system 100A for scalability. As such, the server 110 provides multimedia content to the plurality of client devices 140, optionally via the CDN(s) 130. For the sake of simplicity, the subject matter will be described hereinafter for the most part with reference to a single server 110 and a single CDN 130.

In some embodiments, the server 110 includes an encoder 112 for encoding multimedia content from a content storage 114 (e.g., live or video-on-demand (VOD) content), an intermediate packager 116 for receiving the encoded content from the encoder 112 and creates intermediate units 117 and corresponding metadata, and a just-in-time packager (JITP) 120 for identifying relevant portion(s) within the intermediate units 117 according to request(s) from the client device 140 and converts the relevant portion(s) to a suitable format for adaptive bitrate (ABR) streaming. For example, in FIG. 1A, the JITP 120 packages the intermediate units 117 for LL-HLS streaming in encrypted or unencrypted format to client device 1 140-1 and client device 2 140-2, or packages the intermediate units 117 to other formats such as HLS-TS or HSS in encrypted or unencrypted format to client device 3 140-3 or client device N 140-N.

As used herein, the multimedia content (also referred to hereinafter as "media content", "media content item(s)", "media asset", or "content") provided by the server 110 and received by the client device 140 can include any multimedia data, such as visual data, audio data, and/or text, etc. Further, the server 110 can provide the content and the client device 140 can receive the content in a variety of streaming formats. For example, the encoder 112 can encode the content from the content storage 114 and output content including video and/or audio encoding types such as advanced video coding (AVC), AC3, high efficiency video coding (HEVC), etc. In another example, the intermediate packager can package the encoded content to create the intermediate units 117 according to Common Media Application Format (CMAF) (e.g., for FMP4 segment according to the ISO Base Media File Format (ISO_BMFF)) or CMAF low latency format, etc. In yet another example, based on the request from the client device 140, the JIT packager 120 can package the intermediate units 117 content according to HTTP Live Streaming (HLS), Low Latency HTTP Live Streaming (LL-HLS), HTTP Smooth Streaming (HSS), or Dynamic Adaptive Streaming over HTTP (DASH), etc.

In some embodiments, the intermediate packager 116 packages the intermediate units 117, e.g., CMAF or FMP4 partial segments. In some embodiments, the intermediate packager 116 also generates metadata 118, e.g., CMAF low latency manifest, which specify properties and/or attributes of the intermediate units, e.g., size, offset, etc. The JITP 120, in some embodiments, obtains the intermediate units 117 as well as the metadata 118 from the intermediate packager 116 and packages into various formats for streaming. In addition, to facilitate the content delivery in various formats, in some embodiments, the JITP 120 generates playlists for the content item, e.g., based on the metadata 118. When streaming a content item to the client device 140, the server 110 provides the playlists for the content item, which specifies listings of segments and/or partial segments in the content item to be played sequentially. As used herein, the terms "playlist", "index file", "manifest", "metadata" are used interchangeably. Accordingly, the terms "playlist", "index file", "manifest", and "metadata" in all of their various forms, are understood herein to be referring to the same thing, unless otherwise explicitly noted.

Figure 1B:
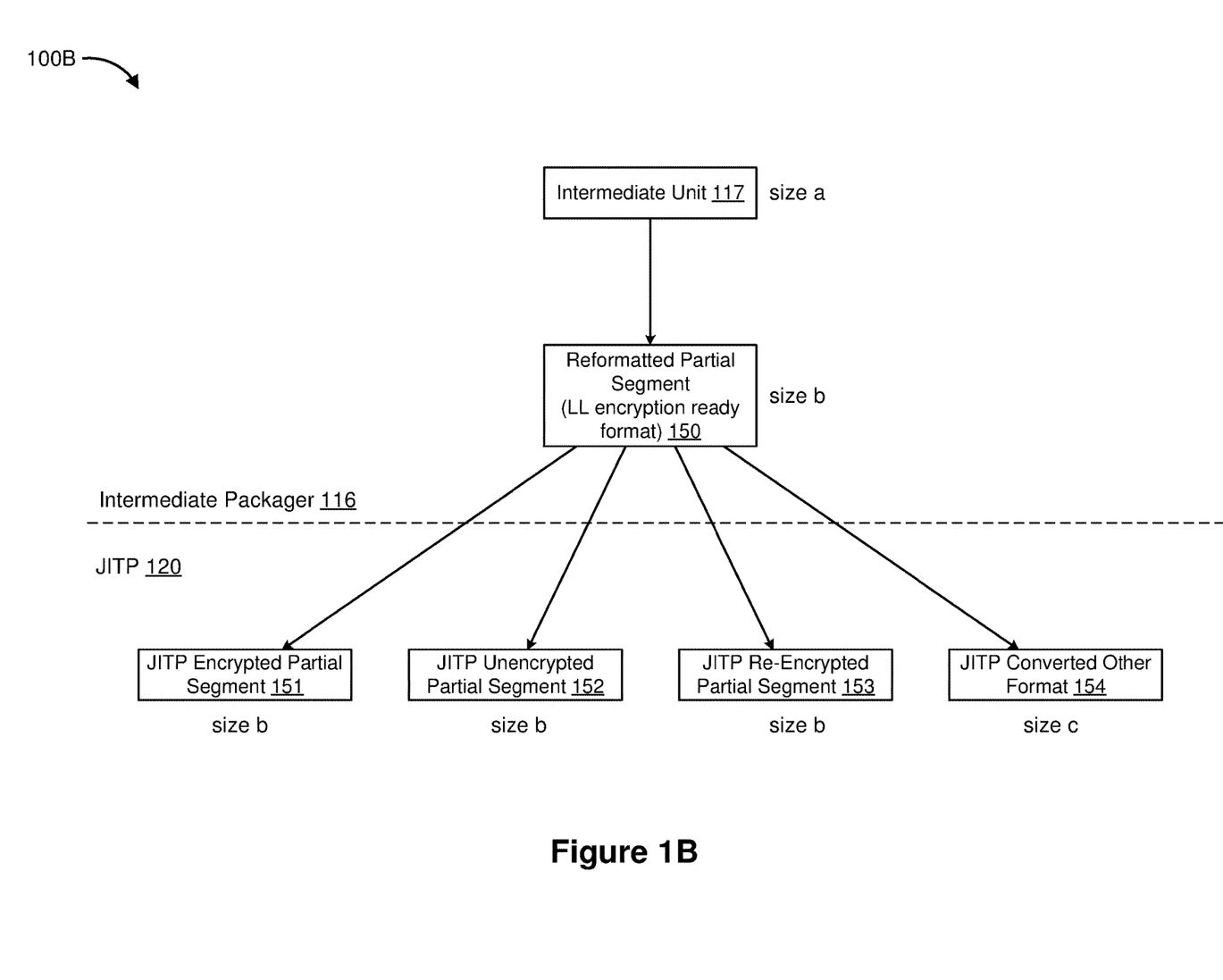

In some embodiments, the intermediate packager 116 reformats the intermediate units 117 in a low latency encryption ready format so that when the JITP 120 packages the intermediate units 117 in the low latency encryption ready format, the partial segment size does not change during packaging, regardless of the encryption status. For example, FIG. 1B is a diagram 100B illustrating packaging in a low latency encryption ready format in accordance with various embodiments. In some embodiments, the intermediate packager 116 creates an intermediate unit 117, e.g., a CMAF partial segment with size a. The intermediate packager 116 then reformats the intermediate unit 117 to generate a reformatted partial segment 150 in the low latency encryption ready format that is of size b. The reformatting of the intermediate unit 117 in the low latency encryption ready format is further described below with reference to FIGS. 2A-2C and 3A-3C. In some embodiments, the intermediate packager 116 stores the reformatted partial segment 150 in the same storage that stores the intermediate unit 117, e.g., by not storing the non-low latency encryption ready formatted intermediate units but storing the reformatted partial segment 150 or replacing the non-low latency encryption ready formatted intermediate units with the reformatted partial segment 150.

As shown in FIG. 1B, when the JITP 120 packages reformatted partial segment 150 into various formats, a JITP encrypted partial segment 151, a JITP unencrypted partial segment 152, and a JITP re-encrypted partial segment 153 for low latency delivery have the same size (e.g., size b) as the reformatted partial segment 150. As such, the JITP 120 can use the partial segment size directly in the manifest provided to the player 144 (FIG. 1A) on the respective client device 140 (FIG. 1A), thus saving processing cost. In some embodiments, the low latency encryption ready format is also compatible with other formats generated by the JITP 120 for streaming. For example, when packaging for client device 3 140-3 (FIG. 1A) and client device N 140-N (FIG. 1A), the JITP 120 can convert a set of reformatted partial segments 150 in the low latency encryption ready format to generate segment(s) in other format 154 for streaming, e.g., HLS-TS or HSS with encryption or without encryption.

FIG. 2A illustrates an exemplary LL-HLS playlist 200A for low latency streaming; and FIG. 2B is a diagram 200B illustrating the JITP serving partial segments according to the exemplary LL-HLS playlist 200A upon requests in accordance with some embodiments. As shown in FIG. 2A, the exemplary LL-HLS playlist 200A in its basic form comprises heading information (e.g., M3U, version, URL, etc.) followed by tags. In particular, each EXTINF is a record marker that describes the segment identified by the Uniform Resource Identifier (URI) that follows it. The format of the URI may vary depending on the embodiment, and the format shown above is one example. The EXTINF tag includes a "duration" attribute (e.g., an integer or floating-point number in decimal positional notation) that specifies the duration of the segment, e.g., in seconds. In the example shown in FIG. 2A, the duration of each segment is 6 seconds.

In LL-HLS, a segment is further divided into smaller units or parts, e.g., partial segments and/or FMP4 partial segments, and each smaller unit or part is listed separately in the playlist following EXT-X-PART tag. As used herein, the smaller units or parts are also referred to as HLS partial segments, FMP4 partial segments, or partial segments. In contrast with the segments, each partial segment has a shorter duration. Because each partial segment has a short duration, it can be packaged, published, and added to the playlist much earlier than its parent segment. As such, the partitioning of segments decouples the end-to-end latency from the long segment duration and allows the client to load parts of a segment as soon as they become available. Further, a playlist can include "preload hints" to allow a player to anticipate what data must be downloaded, thus reducing overhead. As such, LL-HLS provides the same scalability as HLS with reduced latency. In some embodiments, as shown in FIG. 2A, partial segments reference the same file but at different byte ranges. Consequently, clients can thereby load multiple partial segments with a single request and save round-trips compared to making separate requests for each part.

In FIG. 2A, each of the segments 210-1 and 210-2 following the EXTINF tag is 6 seconds. In contrast, each of the partial segments within boxes 220-1 and 220-2 following the EXT-X-PART tag is 1 second. Further, the partial segments within the box 220-1 reference the same file "TS-49410_1_video-147599805471039.mp4" but have different byte ranges as specified by the BYTERANGE addressing. Similarly, the partial segments as indicated by the box 220-2 reference the same file "TS-49410_1_video-147599806011039.mp4" but have different byte ranges. Further, the exemplary playlist 200A includes preload hints marked by EXT-X-PRELOAD-HINT to allow the player (e.g., the player 144, FIG. 1A) to anticipate downloaded data.

In order to generate the exemplary playlist 200A, the intermediate packager (e.g., the intermediate packager 116, FIGS. 1A and 1B) calculates the sizes for the intermediate units during packaging of the intermediate units and reformats the intermediate units in the low latency encryption ready format according to the sizes. The JITP (e.g., the JITP 120, FIGS. 1A and 1B) can then use the predictable sizes as inputs regardless of packaging the partial segments into an encrypted or unencrypted form and pass on the sizes of the partial segments as byte ranges to the player (e.g., the player 144, FIG. 1A) for low latency streaming.

For example, in FIG. 2B, at time T=X, the player references the FMP4 segment TS-49410_1_video-147599806011039.mp4 in the playlist with the line leading by #EXT-X-PRELOAD-HINT tag. In FIG. 2A, the FMP4 segment TS-49410_1_video-147599806011039.mp4 includes multiple FMP4 partial segments. Each of the partial segments includes a Segment Type (STYP) section (e.g., with generic information), a Movie Fragment (MOOF) section, and a Media Data (MDAT) section (e.g., with video or audio data). Because at time T=X, the BYTERANGE-START has the value of 0, the file is empty and has a temporary size of 0 bytes. After 1 second, at time T=X+1, the player references partial segment 1 according to the size of the partial segment for low latency streaming Because the size of partial segment 1 with 1 second duration is 210088 bytes as specified by the BYTERANGE addressing, the player can load 210088 bytes of the FMP4 segment TS-49410_1_video-147599806011039.mp4.

Likewise, at time T=X+2, the player references partial segment 2 based on the byte range addressing referencing partial segment 2 that is 175689 bytes; and at time T=X+3, the player references partial segment 3 based on the byte range addressing referencing partial segment 3 that is 204237 bytes. The JITP (and/or the CDN) serves the FMP4 segment TS-49410_1_video-147599806011039.mp4 progressively while the partial segment(s) become available. In some embodiments, the players request the partial segment(s) according to the byte range. In such embodiments, the player can directly seek a partial segment that is the closest to the live edge to reduce the download overhead, e.g., tuning to a channel at T=X+3 and seeking the byte range 204237 within the FMP4 segment TS-49410_1_video-147599806011039.mp4.

As shown in FIGS. 2A and 2B, the partial segment size is used by the players for low latency streaming. When the intermediate packager preformats the intermediate units to the low latency encryption ready format, the MOOF section size and the MDAT section size do not change regardless of the encryption status during the packaging. Accordingly, the partial segment size is predictable and accurate, and the JITP does not perform additional processing to update the byte range addressing, thus saving processing cost.

Figure 3A:
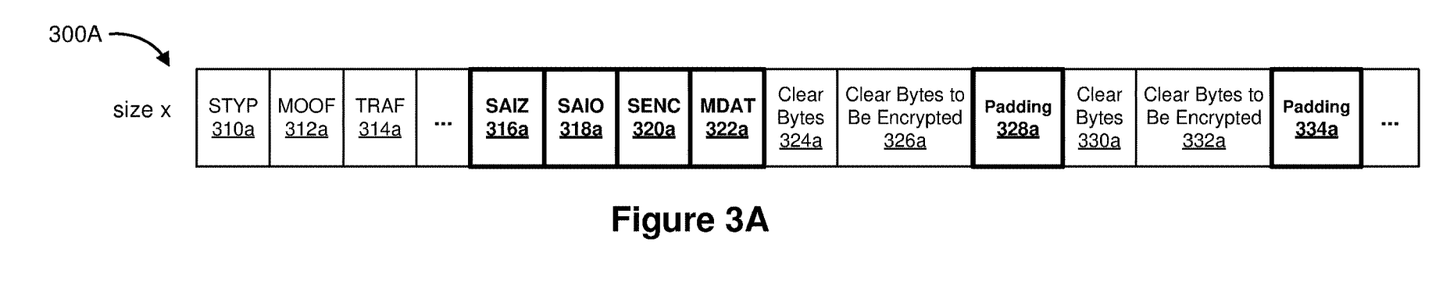
FIGS. 3A-3C and 4A-4C are diagrams illustrating various formats of packaged partial segments in the low latency encryption ready format, in accordance with some embodiments.
Figure 3B:
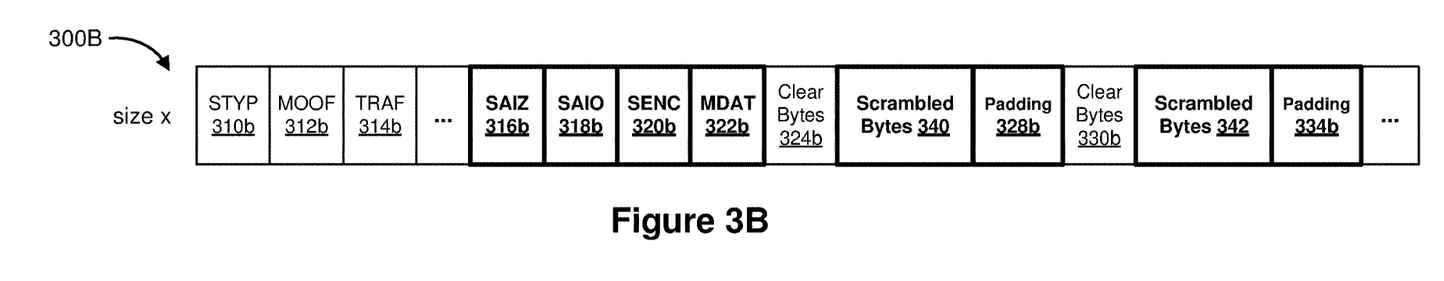
Figure 3C:
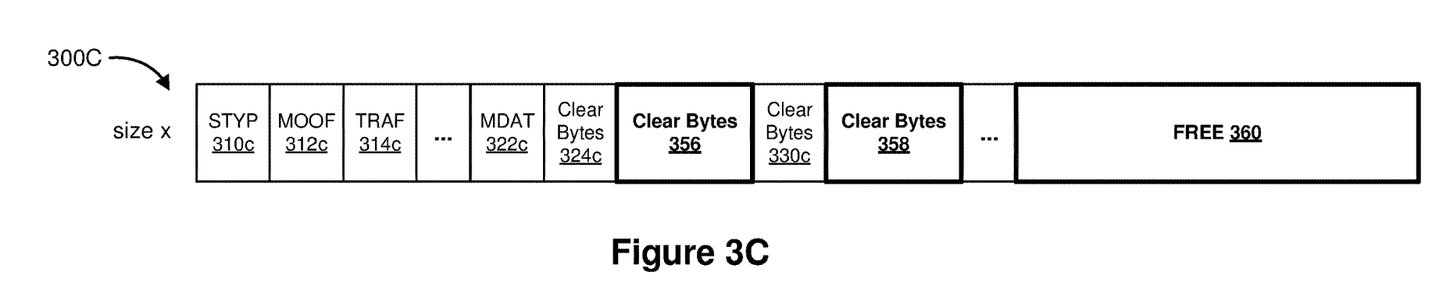

FIG. 3A illustrates a portion of an exemplary reformatted partial segment 300A with padding in a low latency encryption ready format in accordance with some embodiments. FIG. 3B illustrates a portion of an exemplary encrypted partial segment 300B generated by the JITP 120 (FIGS. 1A and 1B) based on the exemplary reformatted partial segment 300A in accordance with some embodiments. FIG. 3C illustrates a portion of an exemplary unencrypted partial segment 300C generated by the JITP 120 (FIGS. 1A and 1B) based on the exemplary intermediate unit 300A in accordance with some embodiments. Elements common to FIGS. 3A-3C include similar reference numbers, and the differences between FIGS. 3A-3C are described herein for the sake of brevity.

In FIG. 3A, the exemplary reformatted partial segment 300A includes an STYP box 310a followed by an MOOF section and then followed by an MDAT section as described in specifications for MPEG-4 ISOBMFF. The MOOF section includes an MOOF box 312a followed by a Track Fragment (TRAF) box 314a. In some embodiments, the intermediate packager generates the reformatted partial segment 300A by injecting encryption specific boxes, e.g., an SAIZ box 316a, an SAIO box 318a, and an SENC 320a, etc., even though the video and/or audio data following the MDAT section is not encrypted, e.g., clear bytes 324a and 330a and clear bytes to be encrypted 326a and 332a following an MDAT box 322a are not encrypted.

In some embodiments, the intermediate packager determines whether to include additional padding for block encryption (e.g., CBC padding) as if the data would have been encrypted. In the case of the encryption requiring the last part of the sample to be encrypted and the last part is shorter than an encryption block, padding is required for block cipher. Upon determining that padding would be required for encryption, the intermediate packager injects padding at appropriate places within the data, e.g., injecting padding 328a between the clear bytes to be encrypted 326a and the clear bytes 330a and injecting padding 334a after the clear bytes to be encrypted 332a.

In FIG. 3B, to encrypt the reformatted partial segment, the JITP applies the encryption on the video and/or audio data following the MDAT box 322b according to the encryption specific boxes 316b, 318b, and/or 320b. In some embodiments, following the information in the SENC box 320b, the JITP applies a block cipher, e.g., applying an in-place AES encryption on the clear bytes to be encrypted 326a and 332a (FIG. 3A) to generate scrambled bytes 340 and 342. As the paddings 328b and 334b are already part of the reformatted partial segment, the encryption does not cause the expansion of the partial segment size, e.g., both the reformatted partial segment 300A and the encrypted partial segment 300B have size x. Because the segment outputs have the same size before and after the encryption process, the JITP can generate the playlist using byte ranges provided by the intermediate packager, e.g., based on the metadata 118 (FIG. 1A) received from the intermediate packager 116 (FIGS. 1A and 1B).

In FIG. 3C, to generate an unencrypted version of the reformatted partial segment, the JITP removes the encryption specific boxes and padding. To maintain the partial segment size, the JITP replaces the SAIZ, SAIO, and SENC atoms 316a-320a (FIG. 3A) with a free atom 360 in accordance with some embodiments. In some embodiments, the padding size, e.g., the size of the padding 328a and 334a (FIG. 3A), is also added to the free atom 360 to make the size of the clear partial segment 300C equal to the size of the encrypted partial segment 300B (FIG. 3B) and equal to the size of the reformatted partial segment 300A (FIG. 3A), e.g., size x.

Figure 4A:
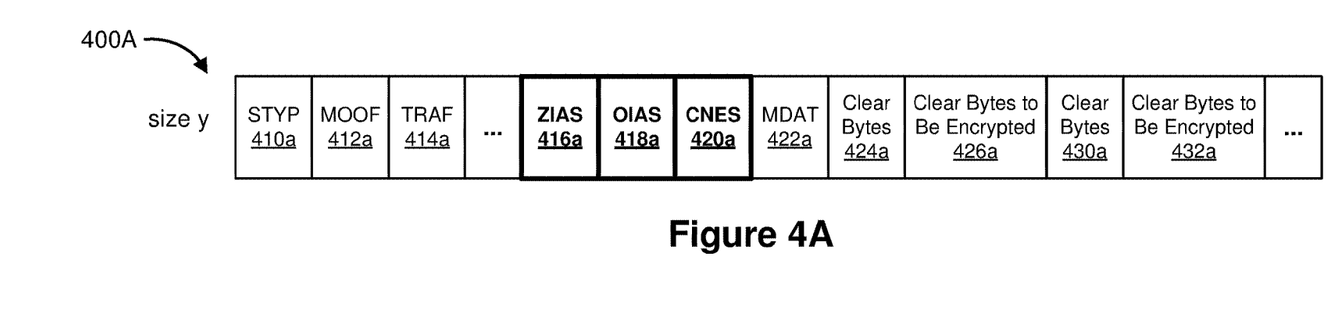
Figure 4B:
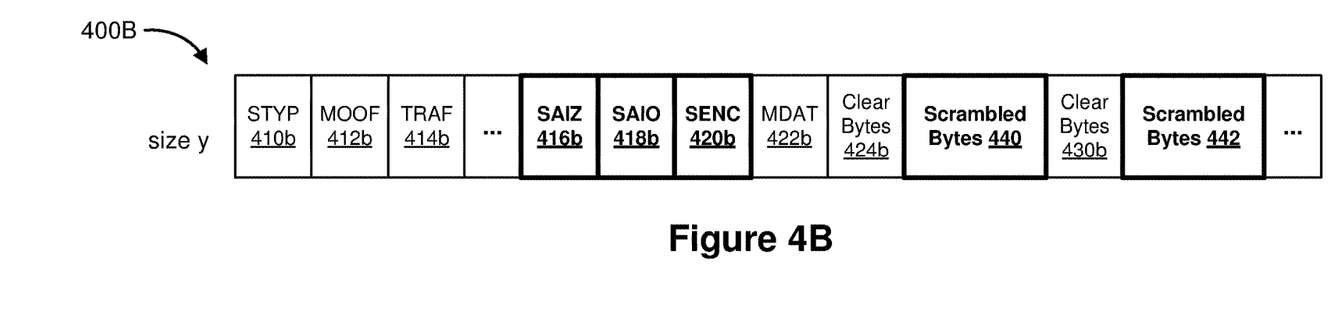
Figure 4C:
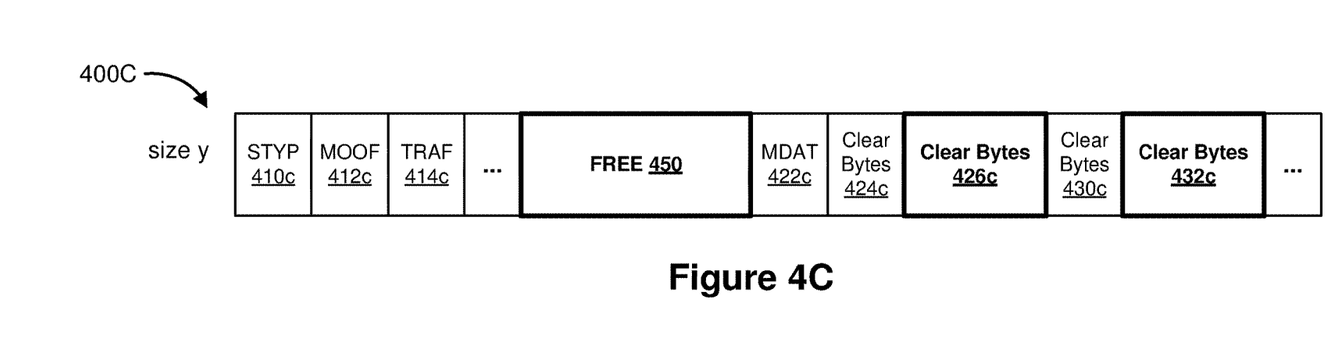

FIG. 4A illustrates a portion of an exemplary reformatted partial segment 400A without padding in a low latency encryption ready format generated by the intermediate packager 116 (FIGS. 1A and 1B) in accordance with some embodiments. FIG. 4B illustrates a portion of an exemplary encrypted partial segment 400B generated by the JITP 120 (FIGS. 1A and 1B) based on the exemplary reformatted partial segment 400A in accordance with some embodiments. FIG. 4C illustrates a portion of an exemplary unencrypted partial segment 400C generated by the JITP 120 (FIGS. 1A and 1B) based on the exemplary reformatted partial segment 400A in accordance with some embodiments. Elements common to FIGS. 4A-4C include similar reference numbers, and the differences between FIGS. 4A-4C are described herein for the sake of brevity.

In FIG. 4A, similar to the exemplary reformatted partial segment 300A (FIG. 3A), the exemplary reformatted partial segment 400A includes an STYP box 410a followed by an MOOF section and then followed by an MDAT section as described in specifications for MPEG-4 ISOBMFF. The MOOF section includes an MOOF box 412a followed by a TRAF box 414a. Further, in some embodiments, as described above with reference to FIG. 3A, the intermediate packager determines whether to include additional padding for block encryption (e.g., CBC padding) as if the data would have been encrypted. Upon determining that padding is not required for encryption, the intermediate packager generates the intermediate unit 400A to include the encryption specific boxes but renaming these boxes with dummy names in accordance with some embodiments. For example, as shown in FIG. 3A, the intermediate packager renames an SAIZ box 416a to "ZAIS", renames an SAIO box 418a to "OIAS", and renames an SENC box 420a to "CENS". By renaming the encryption specific boxes 416a-420a, the players would ignore these boxes. Accordingly, the intermediate unit 400A can be directly readable as the output of the JITP, thus saving processing time.

In FIG. 4B, to encrypt the reformatted partial segment, the JITP first restores the names of the encryption specific boxes, e.g., restoring the name of the SAIZ box 416b, restoring the name of the SAIO box 418b, and restoring the name of the SENC box 420b. In some embodiments, the JITP then applies the encryption on the video and/or audio data following the MDAT box 422b according to the encryption specific boxes 416b, 418b, and/or 420b. In some embodiments, following the information in the SENC box 420b, the JITP applies a block cipher, e.g., applying an in-place AES encryption on the clear bytes to be encrypted 426a and 432a (FIG. 4A) to generate scrambled bytes 440 and 442. As the encryption specific boxes 416a, 418b, and 420b are already part of the reformatted partial segment, the encryption does not cause the expansion of the partial segment size, e.g., both the reformatted partial segment 400A and the encrypted partial segment 400B have size y. Because the segment outputs have the same size before and after the encryption process, the JITP can generate the playlist using byte ranges provided by the intermediate packager.

In FIG. 4C, to generate an unencrypted version of the segment, the JITP removes the encryption specific boxes. To maintain the size, the JITP replaces the SAIZ, SAIO, and SENC atoms 416a-420a (FIG. 4A) with a free atom 450 in accordance with some embodiments. In some embodiments, the size of the free atom 450 is the same as the total size of the SAIZ, SAIO, and SENC atoms 416a-420a to make the size of the clear partial segment 400C equal to the size of the encrypted partial segment 400B (FIG. 4B) and equal to the size of the intermediate unit 400A (FIG. 4A), e.g., size y.

As shown in FIGS. 3A-3C and 4A-4C, using the low latency encryption ready format, the JITP can generate the playlist using partial segments byte ranges calculated based on the input partial segments sizes. In FIGS. 3A-3C, the size of the reformatted partial segment 300A generated by the intermediate packager (e.g., size x) is the same as the size of the encrypted partial segment 300B and the unencrypted partial segment 300C packaged by the JITP, e.g., also size x. Likewise, in FIGS. 4A-4C, the size of the reformatted partial segment 400A (e.g., size y) is the same as the size of the encrypted partial segment 400B and the unencrypted partial segment 400C, e.g., also size y. As such, the encryption by the JITP does not change the partial segment size and the input partial segment size is the same as the output partial segment size. Accordingly, when performing cryptographic operations, such as changing keys and/or re-encryption, the JITP does not need to recalculate the segment byte ranges, thus reducing processing cost.

Figure 5A:
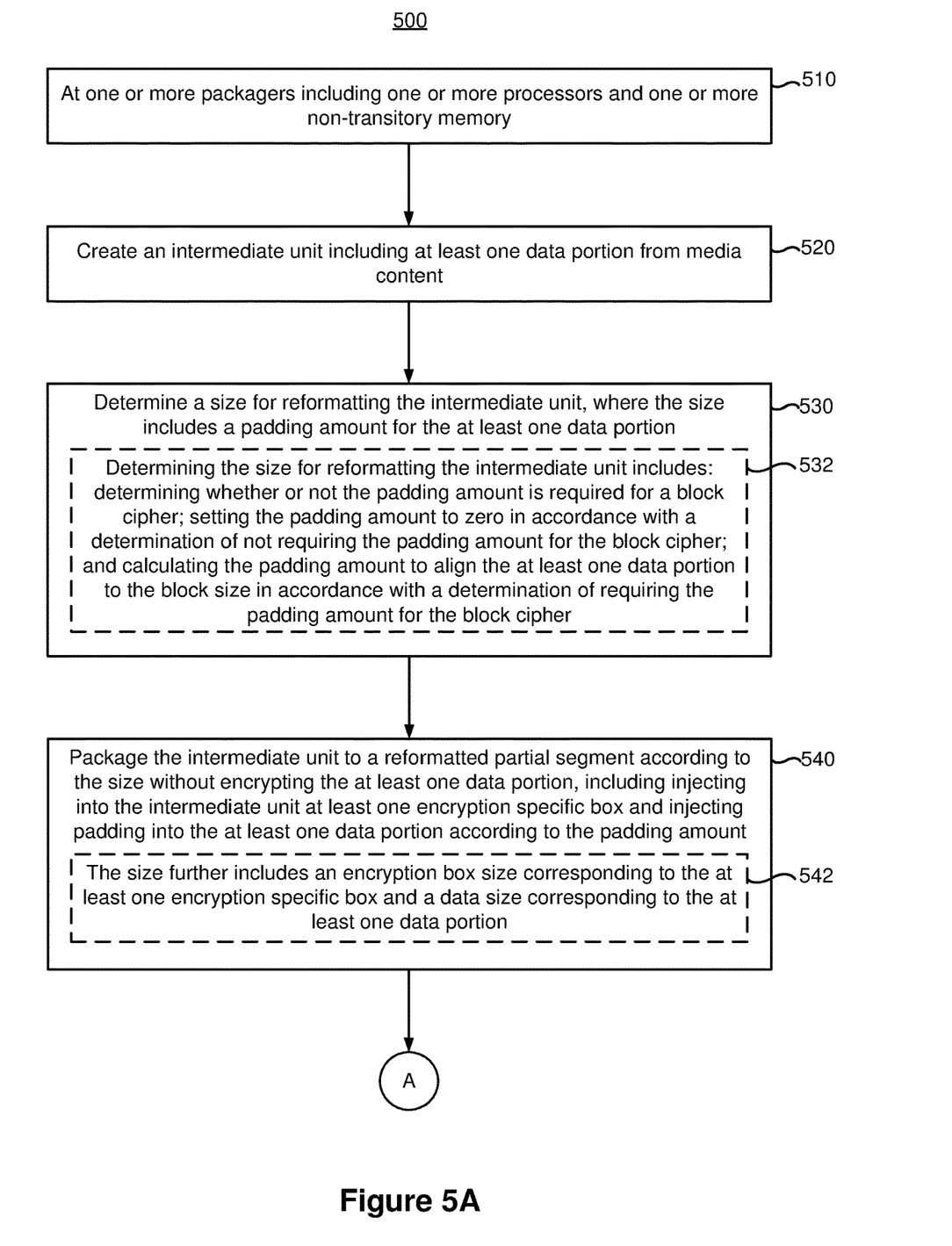
FIGS. 5A and 5B are flowcharts illustrating a method of using a low latency encryption ready format for packaging, in accordance with some embodiments.
Figure 5B:
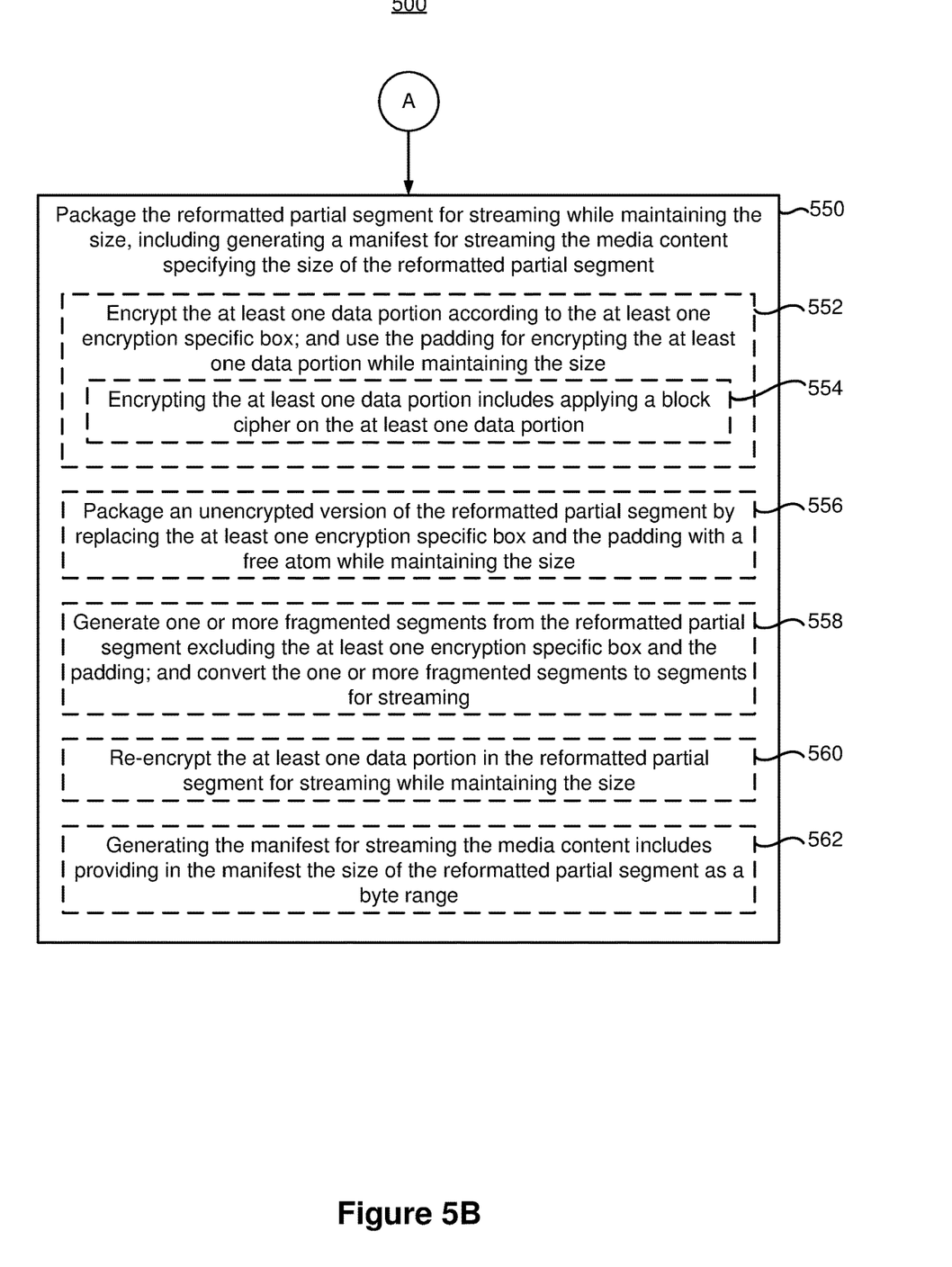

FIGS. 5A and 5B are flowcharts illustrating a method 500 of using a low latency encryption ready format for packaging in accordance with some embodiments. In some embodiments, as represented by block 510, the method 500 is performed at one or more packagers, e.g., the intermediate packager 116 and/or the JITP 120 in FIGS. 1A and 1B. In some embodiments, the one or more packagers include one or more processors and one or more non-transitory memory.

The method 500 begins, as represented by block 520, with the packager(s) (e.g., the intermediate packager 116, FIG. 1) creating an intermediate unit including at least one data portion from mediate content, e.g., creating a CMAF partial segment. As represented by block 530, the method 500 continues, with the packager(s) (e.g., the intermediate packager 116, FIGS. 1A and 1B) determining a size for reformatting the intermediate unit, where the size includes a padding amount for the at least one data portion. As represented by block 532, in some embodiments, determining the size for reformatting the partial segment includes: (a) determining whether or not the padding amount is required for a block cipher; (b) setting the padding amount to zero in accordance with a determination of not requiring the padding amount for the block cipher; and (c) calculating the padding amount to align the at least one data portion to a block size in accordance with a determination of the padding amount is required for the block cipher. The method 500 continues, as represented by block 540, with the intermediate packager packaging the intermediate unit to a reformatted partial segment according to the size without encrypting the at least one data portion, including injecting into the intermediate unit at least one encryption specific box and injecting padding into the at least one data portion according to the padding amount. In some embodiments, as represented by block 542, the size further includes an encryption box size corresponding to the at least one encryption specific box and a data size corresponding to the at least one data portion.

For example, in FIG. 4A, the media data in the at least one data portion following the MDAT box 422a includes the clear bytes 424a, the clear bytes to be encrypted 426a, the clear bytes 430a, and the clear bytes to be encrypted 432a, etc. Having determined that such media data is aligned with a block size for encryption or the encryption does not require block alignment, the intermediate packager does not inject any padding to the data portion. As such, the padding amount in the exemplary partial segment 400A in the low latency encryption ready format is zero. In contrast, in FIG. 3A, the media data in the at least one data portion following the MDAT box 322a includes the clear bytes 324a, the clear bytes to be encrypted 326a, the clear bytes 330a, and the clear bytes to be encrypted 332a, etc. Having determined that such media data is not aligned with the block size for encryption, the intermediate packager calculates the padding amount so that after injecting the padding 328a and 334a, etc. to the data portion, the media data is aligned with the block size for encryption.

In both FIG. 3A and FIG. 4A, the intermediate packager determines the size of the partial segment in the low latency encryption ready format, e.g., the size after reformatting the intermediate unit to include the encryption specific boxes (e.g., SAIZ, SAIO, and SENC, etc.) and optionally the padding in the media data. As a result, in both FIG. 3A and FIG. 4A, while the media data in the low latency encryption ready format are in clear, e.g., the clear bytes 324a and 330a and the clear bytes to be encrypted 326a and 332a in FIG. 3A and the clear bytes 424a and 430a and the clear bytes to be encrypted 426a and 432a in FIG. 4A are unencrypted, and the intermediate packager injects the encryption specific boxes and optionally the padding so that the reformatted partial segment 300A or 400A is ready for low latency encryption without size changes.

Turning to FIG. 5B, the method 500 continues, with the one or more packagers (e.g., the JITP 120, FIGS. 1A and 1B) packaging the reformatted partial segment for streaming while maintaining the size, including generating a manifest for streaming the media content specifying the size of the reformatted partial segment. For example, the JITP packages the reformatted partial segment 300A (FIG. 3A) into the encrypted version 300B (FIG. 3B) or the unencrypted version 300C (FIG. 3C) for streaming while maintaining size x. In another example, the JITP packages the reformatted partial segment 400A (FIG. 4A) into the encrypted version 400B or the unencrypted version 400C (FIG. 4C) for streaming while maintaining size y. Further, the JITP generates the manifest, such as the example shown in FIG. 2A, which specifies the size of the partial segment in the low latency encryption ready format as the value for byte range addressing.

In some embodiments, as represented by block 552, packaging the reformatted partial segment for streaming while maintaining the size includes encrypting the at least one data portion according to the at least one encryption specific box, and using the padding for encrypting the at least one data portion while maintaining the size. In some embodiments, as represented by block 554, encrypting the at least one data portion includes applying a block cipher on the at least one data portion. For example, in FIG. 3B, the JITP uses the padding 328b and 334b for applying an in-place block cipher according to the encryption information in the encryption specific boxes 316b-320b without expanding the partial segment size.

In some embodiments, as represented by block 556, packaging the reformatted partial segment for streaming while maintaining the size includes packaging an unencrypted version of the reformatted partial segment by replacing the at least one encryption specific box and the padding with a free atom while maintaining the size. For example, in FIG. 3C, to generate an unencrypted version of the fragment, the JITP removes the encryption specific boxes and the padding. To maintain the size, the JITP adds the free atom 260 the size of the clear partial segment 300C the same as the encrypted version 300B.

In some embodiments, as represented by block 558, packaging the reformatted partial segment for streaming while maintaining the size includes generating one or more fragmented segments from the reformatted partial segment excluding the at least one encryption specific box and the padding, and converting the one or more fragmented segments to segments for streaming. For example, to generate HLS-TS or HSS segments, the JITP ignores the encryption specific boxes (e.g., SAIZ, SAIO, SENC boxes) and ignores the trailing bytes used by the padding. The JITP then converts the reformatted partial segment excluding the encryption specific boxes and the padding to HLT-TS or HSS segments.

In some embodiments, as represented by block 560, packaging the reformatted partial segment for streaming while maintaining the size includes re-encrypting the at least one data portion in the reformatted partial segment for streaming while maintaining the size. For example, as shown in FIG. 1B, JITP re-encrypted partial segment 153 has the same size as the reformatted partial segment 150 and JITP encrypted partial segment 151, e.g., size b. As such, key changes do not affect the size of the partial segment in the low latency encryption ready format.

In some embodiments, as represented by block 562, generating the manifest for streaming the media content includes providing in the manifest the size of the reformatted partial segment as a byte range. For example, in FIGS. 2A and 2B, the manifest specifies BYTERANGE. As shown in FIGS. 1A and 1B, the JITP 120 generates the playlist using byte ranges calculated based on the input partial segment size obtained from the intermediate packager 116.

Figure 6:
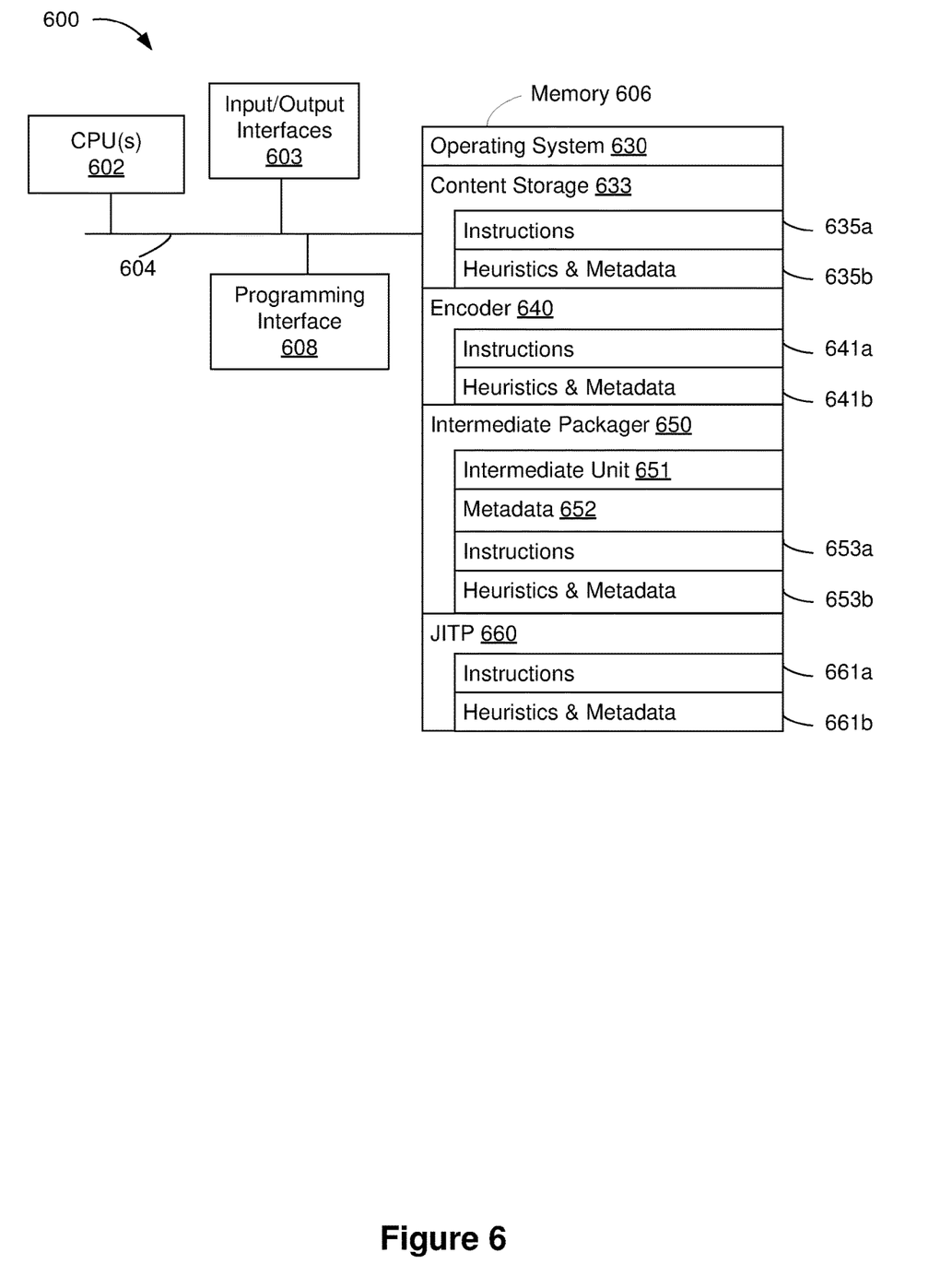
FIG. 6 is a block diagram of a computing device for packaging and publishing key pictures, in accordance with some embodiments.

FIG. 6 is a block diagram of a computing device 600 for packaging and publishing key pictures in accordance with some embodiments. In some embodiments, the computing device 600 corresponds to the server 110 in FIG. 1A and performs one or more of the functionalities described above with respect to the server 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPUs) 602 (e.g., processors), one or more input/output interfaces 603 (e.g., input devices, sensors, a network interface, a display, etc.), a memory 606, a programming interface 608, and one or more communication buses 604 for interconnecting these and various other components.

In some embodiments, the communication buses 604 include circuitry that interconnects and controls communications between system components. The memory 606 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some embodiments, the memory 606 or the non-transitory computer readable storage medium of the memory 606 stores the following programs, modules and data structures, or a subset thereof including an optional operating system 630, a content storage module 633, an encoder 640, an intermediate packager 650, and a JITP 660. In some embodiments, one or more instructions are included in a combination of logic and non-transitory memory. The operating system 630 includes procedures for handling various basic system services and for performing hardware dependent tasks.

In some embodiments, the content storage module 633 (e.g., the content storage 114 in FIG. 1) stores multimedia content. To that end, the content storage module 633 includes a set of instructions 635a and heuristics and metadata 635b.

In some embodiments, the encoder 640 (e.g., the encoder 112 in FIG. 1) is configured to encoder the content from the content storage module 633. To that end, the encoder 640 includes a set of instructions 641a and heuristics and metadata 641b.

In some embodiments, the intermediate packager 650 (e.g., the intermediate packager 116 in FIG. 1) is configured to package the encoded content from the encoder 640 into intermediate units 651 (e.g., the intermediate units 117 in FIG. 1) and generate the corresponding metadata 652 (e.g., the metadata 118 in FIG. 1). To that end, the intermediate packager 650 includes a set of instructions 653a and heuristics and metadata 653b.

In some embodiments, the JITP 660 (e.g., the JITP 120 in FIG. 1) is configured to package the intermediate units 651 and the corresponding metadata 652 to formats for streaming to the client. To that end, the JIT packager 660 includes a set of instructions 661a and heuristics and metadata 661b.

Although the content storage module 633, the encoder 640, the intermediate packager 650, and the JIT packager 660 are illustrated as residing on a single computing device 600, it should be understood that in other embodiments, any combination of the content storage module 633, the encoder 640, the intermediate packager 650, and the JITP 660 can reside in separate computing devices in various embodiments. For example, in some embodiments, each of the content storage module 633, the encoder 640, the intermediate packager 650, and the JITP 660 resides on a separate computing device.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
    creating an intermediate unit including at least one data portion from media content;
    determining a size for reformatting the intermediate unit, wherein the size includes a padding amount for the at least one data portion, including determining whether padding is required for a block cipher, and calculating the padding amount to align the at least one data portion to a block size in accordance with a determination of requiring the padding for the block cipher;
    packaging the intermediate unit to a reformatted partial segment according to the size without encrypting the at least one data portion, including injecting into the partial segment at least one encryption specific box and injecting the padding into the at least one data portion according to the padding amount; and
    packaging the reformatted partial segment for streaming while maintaining the size, including generating a manifest for streaming the media content specifying the size of the reformatted partial segment.

2. The method of claim 1, wherein determining the size for reformatting the intermediate unit includes:
    setting the padding amount to zero in accordance with a determination of not requiring the padding amount for the block cipher.

3. The method of claim 1, wherein the size further includes an encryption box size corresponding to the at least one encryption specific box and a data size corresponding to the at least one data portion.

4. The method of claim 1, wherein packaging the intermediate unit to the reformatted partial segment includes renaming the at least one encryption specific box to at least one dummy box.

5. The method of claim 4, wherein packaging the reformatted partial segment for streaming while maintaining the size includes:
    renaming the at least one dummy box to the at least one encryption specific box; and
    encrypting the at least one data portion according to the at least one encryption specific box without the padding while maintaining the size.

6. The method of claim 1, wherein packaging the reformatted partial segment for streaming while maintaining the size includes:
    encrypting the at least one data portion according to the at least one encryption specific box; and
    using the padding for encrypting the at least one data portion while maintaining the size.

7. The method of claim 6, wherein encrypting the at least one data portion includes applying a block cipher on the at least one data portion.

8. The method of claim 1, wherein packaging the reformatted partial segment for streaming while maintaining the size includes packaging an unencrypted version of the reformatted partial segment by replacing the at least one encryption specific box and the padding with a free atom while maintaining the size.

9. The method of claim 1, wherein packaging the reformatted partial segment for streaming while maintaining the size includes:
    generating one or more fragmented segments from the reformatted partial segment excluding the at least one encryption specific box and the padding; and
    converting the one or more fragmented segments to segments for streaming.

10. The method of claim 1, wherein packaging the reformatted partial segment for streaming while maintaining the size includes:
    re-encrypting the at least one data portion in the reformatted partial segment for streaming while maintaining the size.

11. The method of claim 1, wherein:
    generating the manifest for streaming the media content includes providing in the manifest the size of the reformatted partial segment as a byte range.

12. A system comprising:
    an intermediate packager including a first processor and a first non-transitory memory, wherein the first packager is operable to:
        create an intermediate unit including at least one data portion from media content;
        determine a size for reformatting the intermediate unit, wherein the size includes a padding amount for the at least one data portion, including determining whether padding is required for a block cipher, and calculating the padding amount to align the at least one data portion to a block size in accordance with a determination of requiring the padding for the block cipher; and
        package the intermediate unit to a reformatted partial segment according to the size without encrypting the at least one data portion, including injecting into the partial segment at least one encryption specific box and injecting the padding into the at least one data portion according to the padding amount; and
    a just-in-time packager (JITP) including a second processor and a second non-transitory memory, wherein the JITP is operable to package the reformatted partial segment for streaming while maintaining the size, including generating a manifest for streaming the media content specifying the size of the reformatted partial segment.

13. The system of claim 12, wherein determining the size for reformatting the intermediate unit includes:

setting the padding amount to zero in accordance with a determination of not requiring the padding amount for the block cipher.

14. The system of claim 12, wherein the size further includes an encryption box size corresponding to the at least one encryption specific box and a data size corresponding to the at least one data portion.

15. The system of claim 12, wherein packaging the intermediate unit to the reformatted partial segment includes renaming the at least one encryption specific box to at least one dummy box.

16. The system of claim 15, wherein packaging the reformatted partial segment for streaming while maintaining the size includes:
   renaming the at least one dummy box to the at least one encryption specific box; and
   encrypting the at least one data portion according to the at least one encryption specific box without the padding while maintaining the size.

17. The system of claim 12, wherein packaging the reformatted partial segment for streaming while maintaining the size includes:
   encrypting the at least one data portion according to the at least one encryption specific box; and
   using the padding for encrypting the at least one data portion while maintaining the size.

18. The system of claim 17, wherein encrypting the at least one data portion includes applying a block cipher on the at least one data portion.

19. The system of claim 12, wherein packaging the reformatted partial segment for streaming while maintaining the size includes packaging an unencrypted version of the reformatted partial segment by replacing the at least one encryption specific box and the padding with a free atom while maintaining the size.

20. The system of claim 12, wherein packaging the reformatted partial segment for streaming while maintaining the size includes:
   generating one or more fragmented segments from the reformatted partial segment excluding the at least one encryption specific box and the padding; and
   converting the one or more fragmented segments to segments for streaming.

* * * * *